March 5, 1940.   L. G. SYMONS   2,192,279
FINE SCREEN
Filed Aug. 18, 1937   5 Sheets-Sheet 1

Inventor
Loren G. Symons.
by Parker & Carter Atty's

March 5, 1940. L. G. SYMONS 2,192,279
FINE SCREEN
Filed Aug. 18, 1937 5 Sheets-Sheet 3

Inventor
Loren G. Symons
by Parker & Carter
Attorneys

March 5, 1940.  L. G. SYMONS  2,192,279
FINE SCREEN
Filed Aug. 18, 1937  5 Sheets-Sheet 4

Inventor
Loren G. Symons
by Parker & Carter
Attorneys.

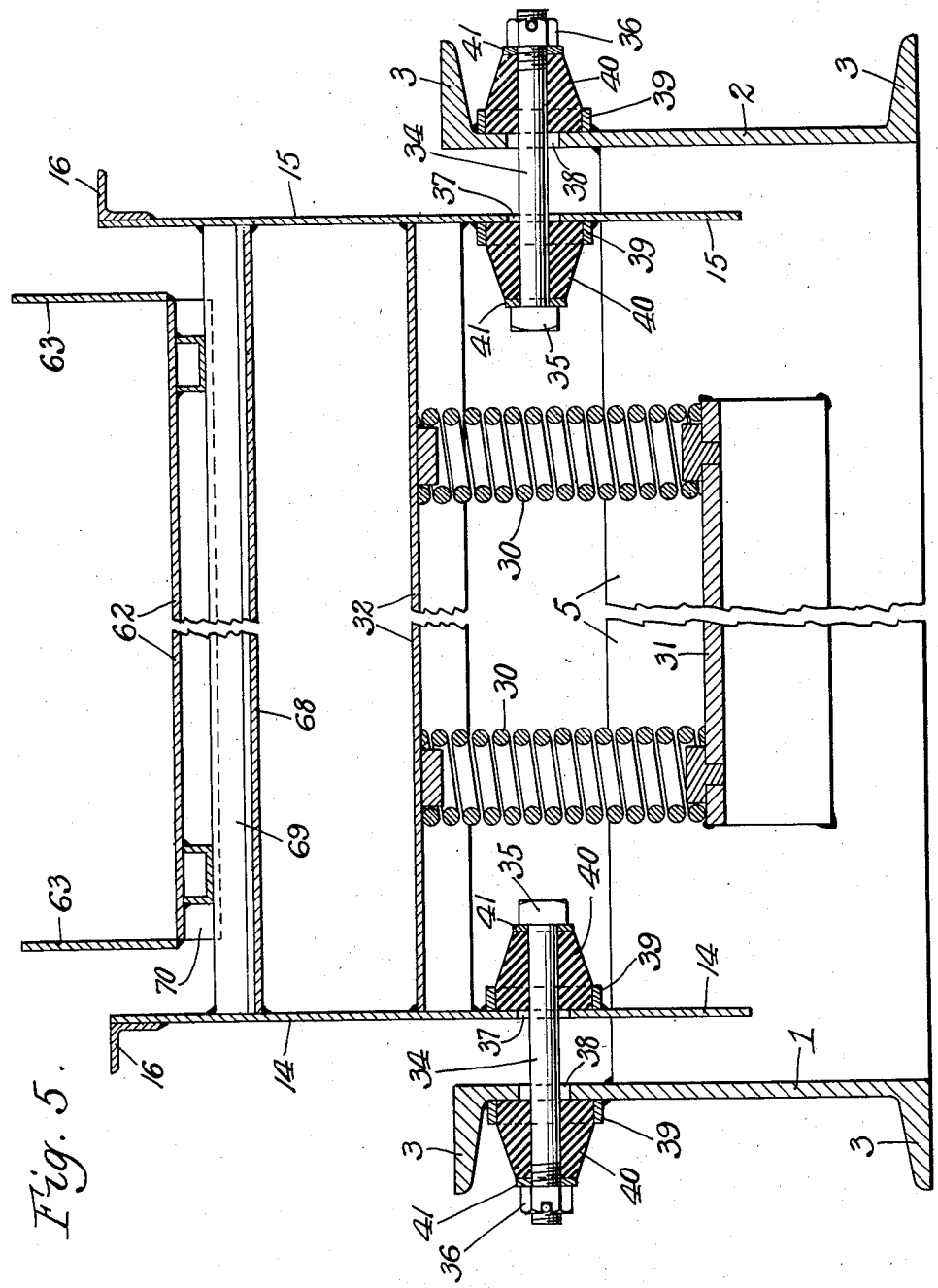

Patented Mar. 5, 1940

2,192,279

UNITED STATES PATENT OFFICE 2,192,279

FINE SCREEN

Loren G. Symons, Hollywood, Calif., assignor to Nordberg Manufacturing Company, Milwaukee, Wis., a corporation of Wisconsin Application August 18, 1937, Serial No. 159,644

5 Claims. (Cl. 209—326)

My invention relates to an improvement in screens and has for one purpose the provision of a screen which is effective and efficient in use and simple to operate.

Another purpose is the provision of a screen which is well adapted for screening sand.

Another purpose is the provision of a screen which is particularly adapted for obtaining a rapid stratification and separation of material on the feed portion of the screen.

Another purpose is the provision of a screen which shall have a violent agitation at the feed end and progressively less agitation toward the discharge end.

Another purpose is the provision of improved means for holding the screen cloth under tension.

Another purpose is the provision of improved means for applying and removing the screen cloth from the screen frame.

Other purposes will appear from time to time in the course of the specification and claims.

I illustrate my invention more or less diagrammatically in the accompanying drawings wherein.

Figure 1:
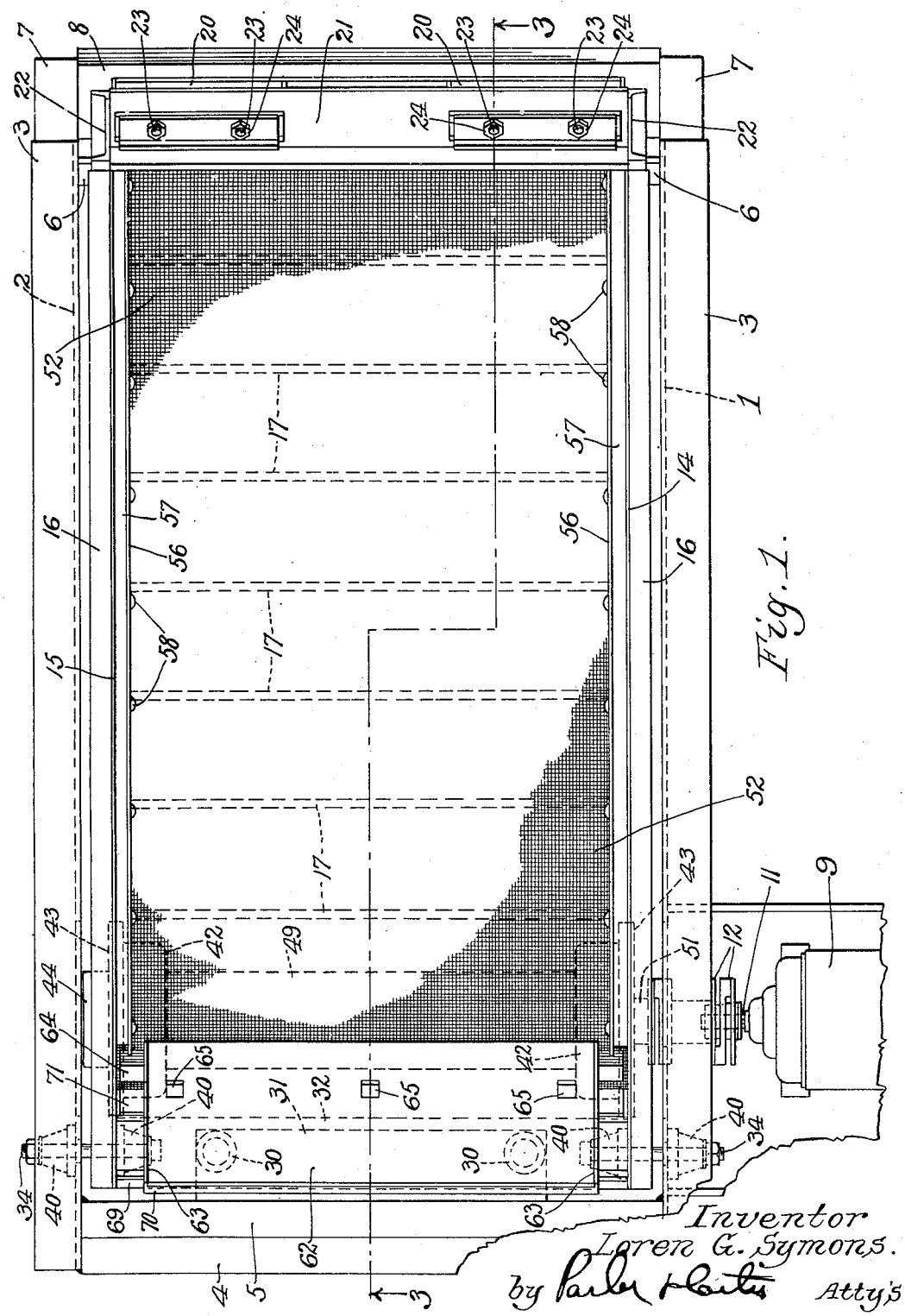
Figure 1 is a plan view.
Figure 2:
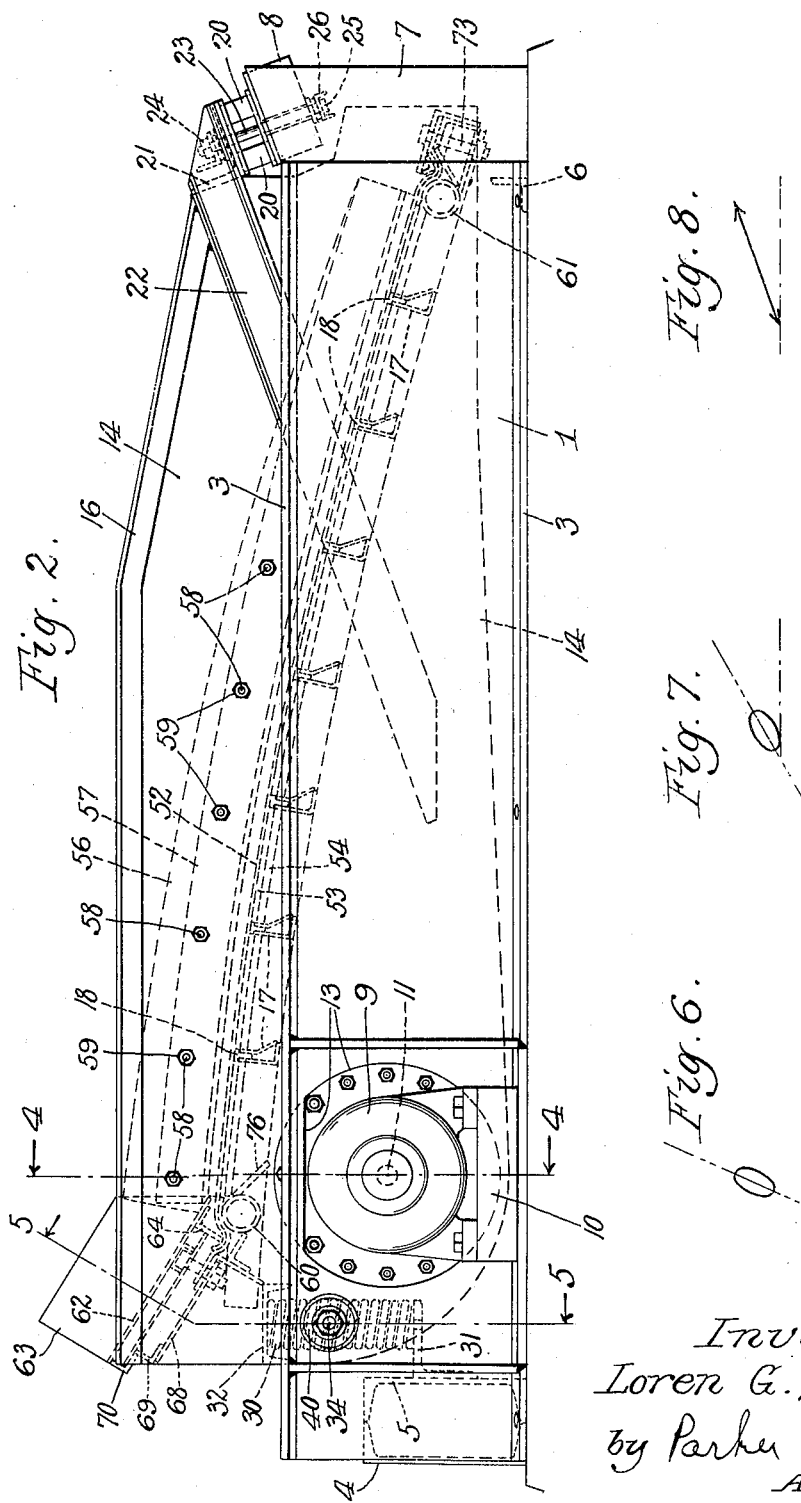
Figure 2 is a side elevation.
Figure 3:
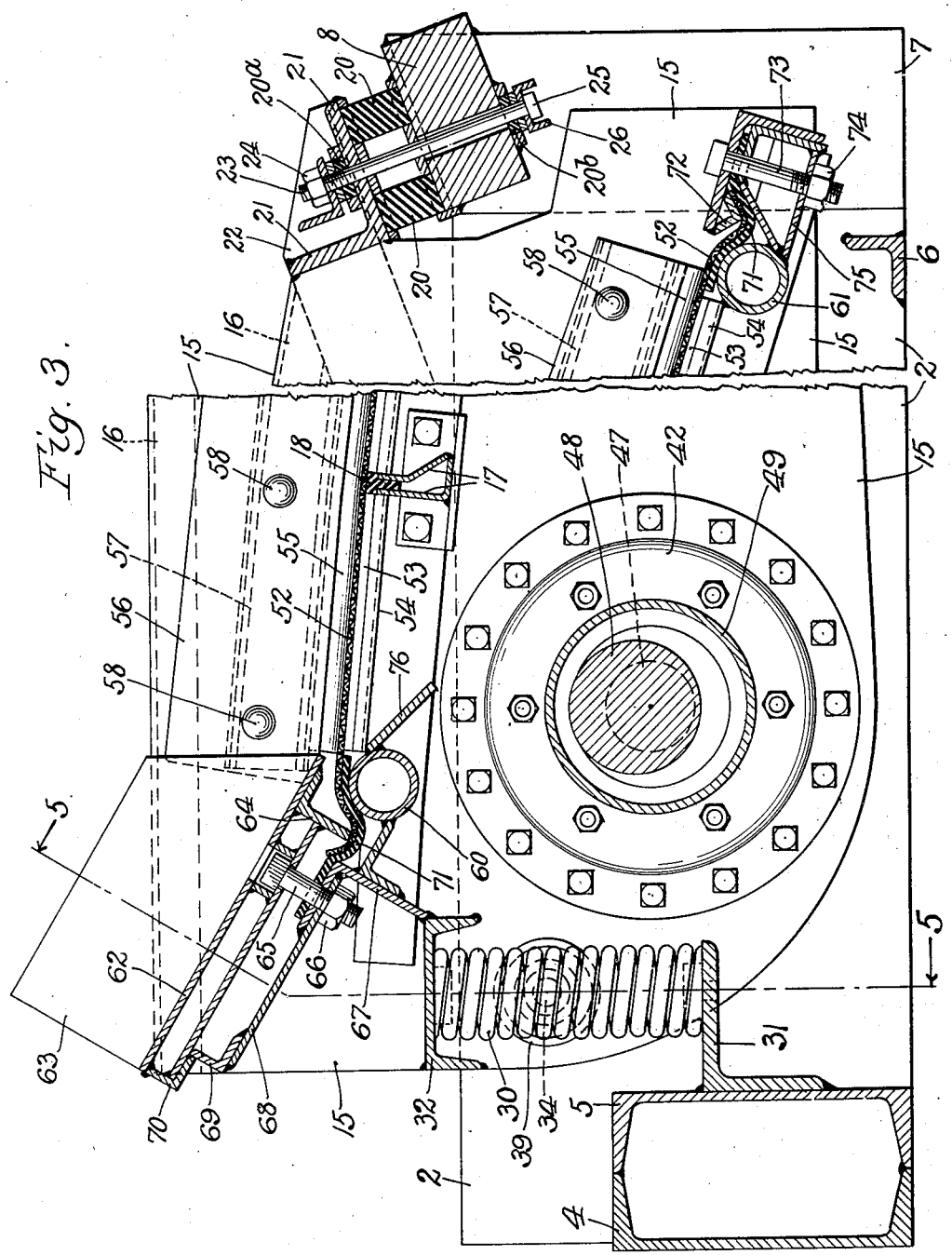
Figure 3 is a section on the line 3—3 of Figure 1 on an enlarged scale.

Figure 5 is a section on the line 5—5 of Figures 2 and 3 on an enlarged scale; and Figures 6, 7 and 8 are diagrammatic illustrations of the movement or vibration form of the screen from the feed to the discharge end.

Like parts are indicated by like symbols throughout the specification and drawings.

Referring to the drawings, I illustrate a main frame or base which may include longitudinally extending and generally parallel channels 1, 2 having outwardly extending flanges 3 and any suitable transversely extending frame members, such for example as the channels 4, 5 with their opposed flanges at the feed end and the angle iron 6 at the discharge end. At the discharge end of the screen I illustrate also upwardly extending side frame members 7 which have associated therewith a transversely extending supporting member 8.

9 indicates a motor which may be mounted on any suitable base or support 10 adjacent the base or main frame. Its motor shaft 11 is shown as provided with flexible coupling means generally indicated as 12, the details of which do not of themselves form part of the present invention.

The side frame member may be cut away as at 13 to permit the passage of the flexible coupling 11.

Positioned within and supported upon the base is a screen frame herein shown as including side members 14, 15 carrying upper strengthening angles 16 and a plurality of transversely extending screen mesh supporting members generally indicated as 17, the details of which do not of themselves form part of the present invention. These transverse supports 17 may for example carry yielding or flexible inserts 18 which directly receive the screen cloth 52.

The discharge end of the screen is mounted on the transversely extending member 8 and is separated therefrom by a pad or pads 20 of yielding or flexible material such as rubber. 21 indicates a transverse screen frame member and 22 strengthening structural members associated with the screen side elements 14 and 15 and associated also with the transverse member 21. The discharge end of the screen is clamped down against the member 8 as by a plurality of bolts 23 with nuts 24 and heads 25 held within channel members 26 to prevent rotation of the bolts. It will be understood, however, that any suitable means may be employed for in effect clamping the discharge end of the screen against a block of yielding flexible material whereby a species of hinge effect is obtained. This permits the screen frame as a whole to flex about what is in effect an axis at the discharge end. It also permits a vibration of the screen frame, such vibration taking at the discharge end the linear form shown in Figure 8. There are two other rubber strips 20a, 20b which are held in place by the bolts 23 and which tend to prevent the angle 21 from bouncing due to the action of the screen.

The opposite or feed end of the screen frame is supported by two or more coil springs 30 the bottoms of which rest upon a bracket 31 secured to the transverse base frame member 5. The tops of the springs 30 support the transverse structural element 32 which connects the side frame members 14, 15 of the screen. Thus the feed end of the screen is allowed a very substantial range of movement, being in effect floated on the coil springs 30.

In order to prevent any substantial transverse or lateral movement of the screen while permitting relative freedom of its movement in vibration, I provide stabilizing members as shown for example in Figure 5 which include bolts 34 headed as at 35 and provided with nuts 36. These bolts extend through apertures 37, 38 in the side frame members of the screen and base, respectively. The apertures are of sufficient size to prevent a metal to metal contact even if a substantial vibration takes place. Cups 39 are provided to hold the elastic cones 40, the opposite ends of the cones being engaged by washers 41. The nuts 36 may be compressed to any desired setting and the compression upon the rubber or elastic cones 40 may thereby be varied. The result, however, is to hold the screen against transverse horizontal vibration while permitting substantial vibration in a vertical plane. The form of the vibration of the feed end of the screen is diagrammatically shown in Figure 6 and the form of vibration of the intermediate portion of the screen, say for example at about the center, is indicated in Figure 7.

Figure 4:
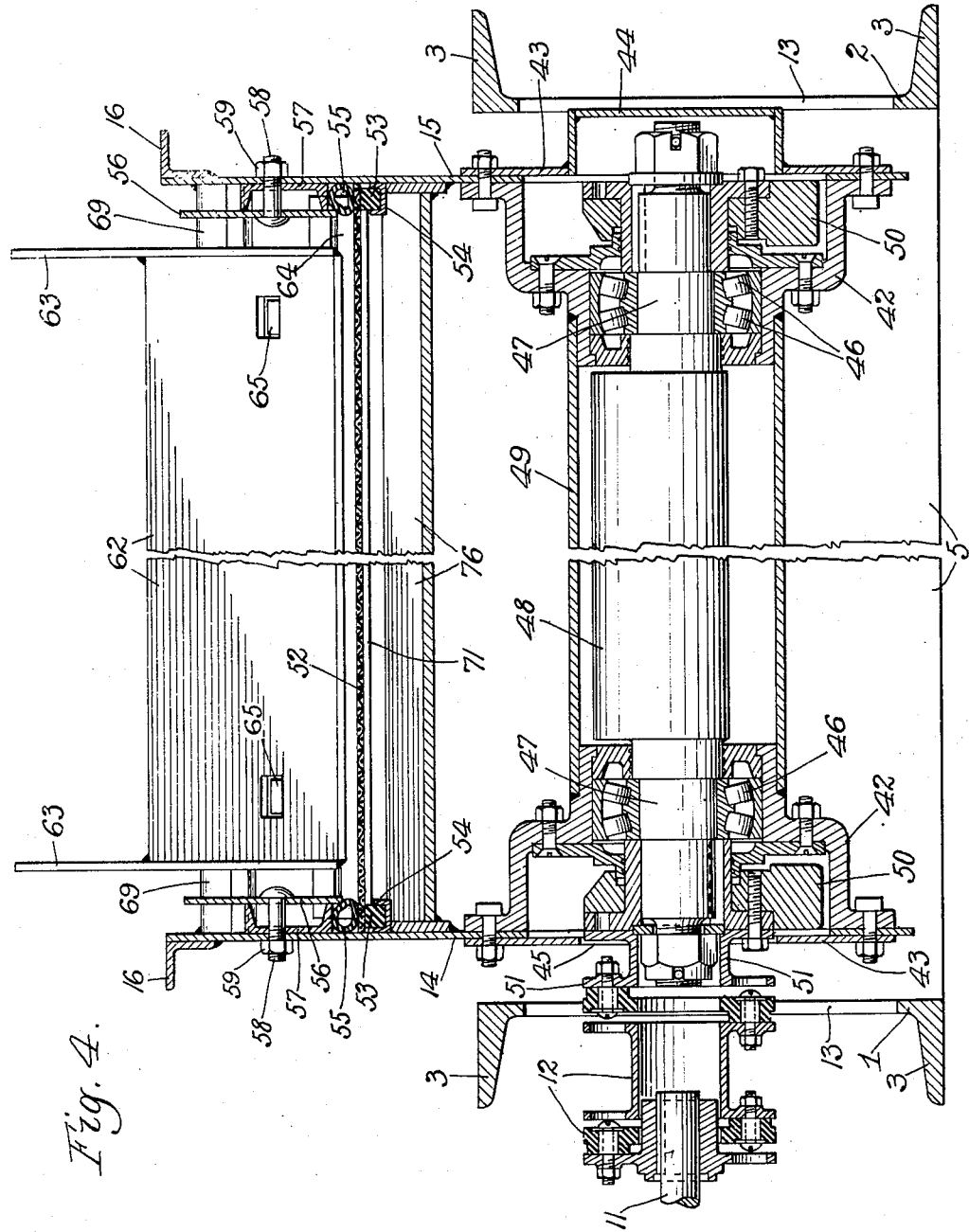
Figure 4 is a section on the line 4—4 of Figure 2 on an enlarged scale.

In order to impart vibration to the screen, I mount an unbalanced rotor at the feed end of the screen as shown for example in Figures 2, 3 and 4. The details of the rotor do not of themselves form part of the present invention but I illustrate cups or housings 42 secured to the inner faces of the screen frame members 14 and 15, respectively, which frame members are cut away in opposition to the central space of the member 42. An outer removable housing member 43 is secured in place, one of the housing members being entirely closed as at 44 and the other being centrally cut away as at 45 in alinement with the flexible coupling 12. Any suitable bearings 46 are provided in which rotates a rotor 47 with its integral unbalanced portion 48. 49 is a cylindrical housing member which serves to house the rotor and to connect together the members 42.

At each end of the rotor 47 and preferably within the housings 42 I illustrate adjustable counterweights 50, the adjustment of which serves to vary the throw or vibration caused by the rotation of the unbalanced rotor. 51 indicates a sleeve secured to one end of the rotor and connected to the flexible coupling 12 whereby when the motor is in operation the unbalanced rotor 47 is driven through the flexible coupling 12 and thereby serves to impart vibration to the screen deck as a whole.

It will be observed that the unbalanced rotor is at the feed end of the screen and is located beneath the feed end of the screen, permitting a low compact and generally horizontal screen structure with the screen cloth or mesh somewhat inclined or sloped downwardly toward the discharge end with the flattest portion of the mesh adjacent the feed end. The location of the rotor at the feed end adjacent the relatively free flexible support for the feed which is constituted by the springs 30 gives the feed end a maximum vibratory movement. The discharge end of the screen being bolted down against the pads 20 of flexible material has a minimum movement and the movement varies progressively from the oval vibration of Figure 6 to the relatively flat linear vibration of Figure 8, Figure 7 indicating the movement of an intermediate portion of the screen.

52 diagrammatically indicates the screen mesh or cloth herein shown as in a single piece and extending from end to end of the screen. It passes over and rests upon the flexible inserts 18 of the transverse frame members 17. Its edges also rest upon yielding elastic strips 53 mounted in channels 54. Tubular yielding members 55 may be compressed against the upper edge of the mesh 52, the members 55 being compressed for example by clamping strips 56 drawn inwardly against limiting channels 57 as by bolts 58 and nuts 59. The channels 57 also serve to strengthen the side members 14 and 15, and the strips 56 serve as wearing plates to protect the side members 14 and 15. Extending across the screen at each end are tubular members 60, 61 over which pass the ends of the mesh 52.

Referring to the feed end, I illustrate also an adjustable feed member or chute including the chute floor 62 with its upwardly extending side walls 63. Associated with the floor 62 is a downwardly extending flange 64 which may be drawn downwardly against the end of the mesh 52 as by the bolts 65 and nuts 66. The bolts 65 pass through a flange of the transversely extending angle 67 which has associated with it a plate 68 and an upper angle 69. The upper end of the floor 62 has on its under side an angle iron 70 which rests against the angle 69 about which it pivots slightly and the effect of tightening up the nut 66 is to draw the lower flange 64 downwardly against the edge of the mesh 52.

The chute 62, which receives the initial feed of material, is vibrated unitarily with the screen cloth 52 and serves as means for effecting an initial stratification of the material with the fine particles forming a stratum or cushion at the bottom of the mass. This stratified mass travels, partly by gravity, down the inclined surface of the member 62 and when the mass reaches the screen cloth 52 it is the underlying stratum of fine particles which engages it.

71 indicates a mat or sheet of flexible material which is held in position for example by being apertured to permit the bolts 65 to pass therethrough. It is of sufficient length to underlie a substantial portion of the edge of the mesh 52 and to overlie the tubular member or abutment 60. When the channel 64 is downwardly drawn into the position in which it is shown in Figure 3, it compresses the edge of the mesh 52 against the mat 71 and draws them both down over the tubular member 60. The result is a tight clamping action on the edge of the mesh 52 which, however, is insufficiently tight to tear the mesh. In other words, the mesh will move over the pad 71 before it will tear. Thus the operator cannot by unintended excessive compression tear the edge of the mesh.

A similar arrangement is provided for the opposite end of the mesh but in this case the angle member 72 takes the place of the flange 64, it being downwardly drawn as by the bolts 73 and nuts 74 against the abutment 75. Associated with the member 60 is a plate 76 for the purpose of deflecting screened material from the cylindrical housing 42, 49.

It will be realized that whereas I have described and shown a practical and operative device, nevertheless many changes may be made in the size, shape, number and disposition of parts without departing from the spirit of my invention. I therefore wish my description and drawings to be taken as in a broad sense illustrative or diagrammatic rather than as limiting me to my precise showing.

It will be understood also that the details of the screen might be widely changed without departing from the spirit of my invention.

The use and operation of my invention are as follows:

I find it desirable for example in screening sand or finely divided materials to employ a relatively violent vibration at the feed end of the screen in order to cause as quick a stratification as possible. It is a problem in a mixed mass of material to get the fine particles down to the screen mesh. It frequently happens in existing types of screens that fine particles which if they reached the face of the mesh would pass through are carried on over the screen in association with other larger particles. In screening materials which contain a large proportion of sand or fine particles, I find it desirable to subject the mass to a violent vibration at the feed end of the screen and at the portion of the screen where the mesh has a minimum angle. The result of the violent vibration is a very rapid stratification of material and the delivery to contact with the screen mesh of a very large proportion of the fine particles.

In the employment of a screen of the type shown in the present drawings, the violent vibration indicated by the vibration diagram of Figure 6 causes a very efficient stratification and separation of fine particles in the initial third or quarter of the screen. Thereafter, the fine particles having to a large extent been removed from the mass, the vibration can properly be changed in its nature and can become increasingly linear and forwardly inclined. This in connection with the increased inclination of the screen carries off the oversize particles to the discharge end and also permits the relatively smaller mass of retaining fine particles readily to reach the screen face or screen mesh and be separated out.

As will be clear from Figures 6, 7 and 8, the agitation is most violent and most nearly vertical at the feed end due to the constraining motion of the discharge end of the screen and the floating support of the feed end of the screen. The out of balance rotor sets up a screening motion that varies from an elliptical motion at the feed end, with the major axis inclined somewhat forward of vertical, to a straight line motion at the discharge end, of a somewhat smaller magnitude. The motion at the center is a combination of the two, or a flat ellipse with a major axis approximately thirty degrees from horizontal. These three stages or paths of vibration are shown in Figures 6, 7 and 8.

As a result, the action on the material at the feed end is to subject it to a very severe and generally vertical agitation. This causes or allows rapid stratification and a quick settling of the fines to the bottom. As the problem is to get the fines to the bottom, once they reach the bottom they readily pass through the mesh. As the material progresses down the screen there is a gradual lessening of the motion of the agitation. At the discharge end the vertical component is very slight and this more gentle conveying action allows the material of "critical size" to be screened.

In particular, I find that the member 62, being vibrated in unison with the screen cloth 52 and being located adjacent the vibrating mechanism, serves as a stratifying member. In the normal use of the device, when a mixed mass of particles of varying sizes is delivered to the chute 62, the violent vibration of the feed end of the screen causes a very rapid stratification, with the fine particles at the bottom and the coarse particles at the top. This stratified mass travels downwardly along the chute 62, its movement being assisted by the inclination of the chute, when an inclined chute is employed. In any event, the stratified mass passes over the discharge edge of the member 62 and the lower stratum of fine particles engages the surface of the mesh 52. This obtains the double result of an immediate and efficient separation and of protecting the feed end of the screen cloth from wear.

In practice, in the present type of screen, it is the feed end of the screen cloth which wears, and owing to the fact that unless some stratifying means are employed the larger particles, which have a more abrasive effect owing to their larger mass, are able to engage the surface of the mesh 52 at the very point or zone where there is a maximum violence of vibration. The result is that in the field, in the absence of stratifying means, the feed end of the cloth tends to wear out much more rapidly than the rest of the cloth. This necessitates throwing away screen cloth which is unworn or is only slightly worn throughout a major portion of its length but which is worn out at the feed end. I find that the employment of the stratifying member 62 minimizes this tendency to wear at the feed end of the cloth and also very largely increases the capacity of the screen in proportion to its length. The underlying stratum of fines very rapidly passes through the screen cloth but by the time the coarser material is able to contact the screen cloth the coarser particles have already traveled a substantial proportion of the length of the screen and have reached the zone of less violent vibration.

This movement may be summarized as follows. At the feed end of the screen the mesh 52 is substantially horizontal so that there is a minimum tendency of the material fed to the screen to move down along the screen by gravity. The diagram of Figure 6 indicates that it is at this relatively horizontal part of the screen that the vertical component of the vibration form is the greatest. In other words, there is an almost vertical vibration of the material on the flat end of the screen with a maximum stratifying effect and a minimum conveying effect. From then on down the screen the angle of the screen increases and thus the gravital assistance to the feed also increases. At the same time the vibration form changes and increasingly approaches the horizontal, becoming practically linear and almost horizontal at the discharge end of the screen. Thus after the stratification and the initial separation of the fine particles has taken place at the feed end of the screen, the remaining material is conveyed down the screen with maximum rapidity and the conveying action is obtained or increased both by the increasing slope of the screen and by the increasing conveying effect of the vibration.

In other words, by my apparatus and method the mass of fines which are well within the mesh size are very rapidly stratified at the feed end of the screen and are carried through. This leaves the major length of the screen to the task of screening out the critical sizes which are closer in size to the mesh openings. This critical screening is not hampered by the clogging with fines which is so frequently a normal accompaniment to the normal operation of the ordinary screens now on the market. The employment of my screen and method results, therefore, in a very substantial increase in efficiency of screening and in the volume which can be handled by a screen of given size or given power consumption.

It will be observed that the rubber transverse supports 18, as shown for example in Figure 3, snugly overlie the upper edges of the flanges 17 in such fashion that no crack or aperture is provided which would permit sand or grit to get in between the rubber and the metal. This is important as such materials tend to act as abrasives and would rapidly wear out the metallic portions of the screen support wherever an opening presented itself. Hence the importance of having a sharp contact edge between the rubber 18 and the metallic portions 17.

I claim:

1. In a screen, a base, a screen frame mounted on said base, supporting means for the discharge end of said frame, including a supporting element of yielding compressible material compressed between screen and base, said screen and base being provided with opposed members having parallel faces lying in planes parallel with a desired linear vibration, means for clamping said opposed faces together with the yielding compressible support therebetween and for preventing their unintended separation, while permitting the relative movement of the opposed portion of the screen in relation to the base in a plane parallel with the planes of the opposed members, means mounted on the frame for imparting vibration thereto, including an unbalanced rotor and means for rotating it, and means for constraining the feed end of the screen to a generally orbital vibration.

2. In a screen, a base, a screen frame mounted on said base, supporting means for the discharge end of said frame, including a supporting element of yielding compressible material compressed between screen and base, said screen and base being provided with opposed members having parallel faces lying in planes forwardly and upwardly inclined from the horizontal in the direction of the discharge end of the screen, means for clamping said opposed faces together with the yielding compressible support therebetween and for preventing their unintended separation, while permitting the relative movement of the opposed portion of the screen in relation to the base in a plane parallel with the planes of the opposed members, means mounted on the frame for imparting vibration thereto, including an unbalanced rotor and means for rotating it, and means for constraining the feed end of the screen to a generally orbital vibration.

3. In a screen, a base including parallel side members and a screen frame mounted thereon and extending into the space between said base side members, supporting means for the feed end of the screen frame including vertical coil springs interposed between the screen frame and the base and located between said side members of the base, means for imparting vibration to the screen, including an unbalanced rotor mounted on the screen and located between and in the general level of said side members, and located adjacent said supporting springs, means for supporting the discharge end of the screen frame, including opposed transversely extending members on frame and base having generally parallel opposed faces forwardly and upwardly inclined in relation to the direction of feed of the screen, a supporting element of yielding compressible material located therebetween, and means for holding said opposed faces against movement away from each other and for thereby maintaining said supporting element under a predetermined compression while permitting relative movement of the discharge end of the screen frame in relation to the base in a plane generally parallel with the planes of said opposed surfaces.

4. In a screen, a base including parallel side members and a screen frame mounted thereon and extending into the space between said base side members, supporting means for the feed end of the screen frame including vertical coil springs interposed between the screen frame and the base and located between said side members of the base, means for imparting vibration to the screen, including an unbalanced rotor mounted on the screen and located between and in the general level of said side members, and located adjacent said supporting springs, means for supporting the discharge end of the screen frame, including opposed transversely extending members on frame and base having generally parallel opposed faces forwardly and upwardly inclined in relation to the direction of feed of the screen, a supporting element of yielding compressible material located therebetween, means for holding said opposed faces against movement away from each other and for thereby maintaining said supporting element under a predetermined compression while permitting relative movement of the discharge end of the screen frame in relation to the base in a plane generally parallel with the planes of said opposed surfaces, and a screening medium mounted on said screen frame and including a generally horizontal portion overlying said unbalanced rotor, and a progressively downwardly inclined portion extending thence to the discharge end of the screen, the discharge end of the screening medium being spaced substantially beneath the supporting element for the discharge end of the screen frame.

5. In a screen, a base including parallel side members and a screen frame mounted thereon and extending into the space between said base side members, supporting means for the feed end of the screen frame including vertical coil springs interposed between the screen frame and the base and located between said side members of the base, means for imparting vibration to the screen, including an unbalanced rotor mounted on the screen and located between and in the general level of said side members, and located adjacent said supporting springs, means for supporting the discharge end of the screen frame, including opposed transversely extending members on frame and base having generally parallel opposed faces forwardly and upwardly inclined in relation to the direction of feed of the screen, a supporting element of yielding compressible material located therebetween, means for holding said opposed faces against movement away from each other and for thereby maintaining said supporting element under a predetermined compression while permitting relative movement of the discharge end of the screen frame in relation to the base in a plane generally parallel with the planes of said opposed surfaces, and a motor mounted on the exterior of one of said side members and laterally alined with said unbalanced rotor, said side member being apertured therebetween, and a flexible driving connection extending through said aperture and connecting said motor and said unbalanced rotor.

LOREN G. SYMONS.